: US 8,116,755 B2
(45) Date of Patent: Feb. 14, 2012

(12) United States Patent
Ootsuka

(54) MOBILE COMMUNICATION TERMINAL AND MOVING SPEED DETECTION METHOD FOR THE SAME

(75) Inventor: Osamu Ootsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 372 days.

(21) Appl. No.: 12/442,224

(22) PCT Filed: Sep. 12, 2007

(86) PCT No.: PCT/JP2007/067768
§ 371 (c)(1),
(2), (4) Date: Mar. 20, 2009

(87) PCT Pub. No.: WO2008/038520
PCT Pub. Date: Apr. 3, 2008

(65) Prior Publication Data
US 2010/0081420 A1   Apr. 1, 2010

(30) Foreign Application Priority Data
Sep. 25, 2006   (JP) .................................. 2006-258457

(51) Int. Cl.
H04W 4/00 (2009.01)
H04W 36/00 (2009.01)
H04B 1/34 (2006.01)
H04B 1/06 (2006.01)
G01S 13/08 (2006.01)
G01S 19/40 (2010.01)
G01S 19/52 (2010.01)
G01S 3/02 (2006.01)

(52) U.S. Cl. ......... 455/422.1; 455/441; 455/10; 455/99; 455/238.1; 342/104; 342/357.23; 342/357.35; 342/461

(58) Field of Classification Search .................. 455/441, 455/11.1, 62, 63.3, 71, 99, 152.1, 161.1, 455/238.1, 297, 345, 569.2; 342/104–117, 342/357.2, 357.23, 357.35, 461; 340/670, 340/441, 444, 466, 936, 969, 978; 701/93, 701/110, 119, 121; 324/160, 161; 73/115.08, 73/488
See application file for complete search history.

(56) References Cited

U.S. PATENT DOCUMENTS
6,330,446 B1 * 12/2001 Mori .......................... 455/435.2
(Continued)

FOREIGN PATENT DOCUMENTS
JP      2000092540 A      3/2000
(Continued)

OTHER PUBLICATIONS
International Search Report for PCT/JP2007/067768 mailed Dec. 18, 2007.

*Primary Examiner* — Rafael Pérez-Gutiérrez
*Assistant Examiner* — Thai Vu

(57) ABSTRACT

A mobile communication terminal and a moving speed detection method which are capable of detecting a moving speed with high accuracy are provided. A mobile communication terminal 10 includes a plurality of moving speed detector sections, i.e., a first moving speed detector section 30 and a second moving speed detector section 32 which have mutually different detection methods and a speed detection value selector section 34 to select any one of respective speed detection values of the detector sections 30 and 32 based on a predetermined selection criterion.

20 Claims, 3 Drawing Sheets

U.S. PATENT DOCUMENTS

| | | | |
|---|---|---|---|
| 7,107,056 B2 * | 9/2006 | Peng .............................. | 455/441 |
| 7,218,934 B2 * | 5/2007 | Juncker et al. ................. | 455/441 |
| 2006/0099940 A1 * | 5/2006 | Pfleging et al. ............... | 455/419 |
| 2006/0182062 A1 * | 8/2006 | Sdralia et al. .................. | 370/331 |
| 2008/0032712 A1 * | 2/2008 | Bemmel et al. ............... | 455/441 |

FOREIGN PATENT DOCUMENTS

| | | |
|---|---|---|
| JP | 2001169339 A | 6/2001 |
| JP | 2002141858 A | 5/2002 |
| JP | 2004235681 A | 8/2004 |
| JP | 2007020074 A | 1/2007 |

\* cited by examiner

F I G. 2

COMMUNICATION PARAMETER VALUE DEFINITION TABLE TBL

| SPEED DETECTION VALUE D3 \ COMMUNICATION PARAMETER VALUE | RADIO CHANNEL MONITOR INTERVAL | NEIGHBOR CHANNEL MONITOR INTERVAL | CLOSED LOOP POWER CONTROL | CELL RETRIEVAL ALGORITHM | CHANNEL ESTIMATION | BUS REALLOCATION AVERAGING NUMBER | ..... |
|---|---|---|---|---|---|---|---|
| 0~10km/h | 5 seconds | 10 seconds | EXECUTE | METHOD A | METHOD X | 10 samples | ..... |
| 10~20km/h | 5 seconds | 3 seconds | EXECUTE | METHOD A | METHOD X | 20 samples | ..... |
| 20~60km/h | 3 seconds | 2 seconds | STOP | METHOD B | METHOD X | 50 samples | ..... |
| 60~120km/h | 1 second | 1 second | STOP | METHOD B | METHOD Y | 200 samples | ..... |
| 120km/h~ | ...... | | | | | ...... | ..... |

MOBILE COMMUNICATION TERMINAL AND MOVING SPEED DETECTION METHOD FOR THE SAME

This application is the National Phase of PCT/JP2007/067768, filed Sep. 12, 2007, which is based upon and claims the benefit of priority from Japanese patent application No. 2006-258457, filed on Sep. 25, 2006, the disclosure of which is incorporated herein in its entirety by reference.

TECHNICAL FIELD

The present invention relates to a mobile communication terminal such as a cellular and a moving speed detection method for the same.

RELATED ART

At present, mobile communication terminals such as a cellular are broadly used. Such a mobile communication terminal carries out a cell switching operation (handover) to continue a call even if the terminal moves across radio base stations. For this purpose, it is required to periodically detect a cell, but the cell detection is conventionally conducted at a regular interval. In this regard, in a situation wherein the cell detection interval is fixed, if the interval is too short, power is excessively consumed; contrarily, if the interval is too long, the handover cannot be conducted at an appropriate point of time when the mobile communication terminal moves at a high speed. To cope therewith, a technology has been proposed to alter the cell detection interval according to the speed (e.g., Patent Document 1). Due to the operation, the handover can be appropriately carried out without excessively consuming power.

Patent Document 1: Japanese Patent Laid-Open Publication No. 2001-169339 (paragraph 0063; FIG. 8)

DISCLOSURE OF THE INVENTION

Problem to be Solved by the Invention

In this case, it is important how to detect the moving speed of the mobile communication terminal with high accuracy. This is because an appropriate cell detection interval cannot be set if accuracy of the detected moving speed is low. As a result, lowering the consumption power of the terminal and appropriately conducting the handover cannot be achieved.

The present invention has been devised to solve the problem above and is to provide a mobile communication terminal and a moving speed detection method therefor which are capable of detecting a moving speed with high accuracy.

Means for Solving the Problem

To solve the problem, a mobile communication terminal of the present invention includes a plurality of moving speed detector sections having mutually different detection methods and a speed detection value selector section for selecting any one of speed detection values of the respective moving speed detector sections on the basis of a predetermined selection criterion.

In this situation, the plurality of moving speed detector sections may be a first moving speed detector section to detect a moving speed using a fading frequency and a second moving speed detector section to detect a moving speed using a cell moving frequency.

Also, in this case, the speed detection value selector section is capable of selecting a speed detection value of the first moving speed detector section if the mobile communication terminal is in communication.

Moreover, the speed detection value selector section can select a speed detection value of the second moving speed detector section if the mobile communication terminal is in a wait state and the speed detection value of the second moving speed detector section is less than a predetermined value.

Additionally, the speed detection value selector section is capable of selecting a speed detection value of the first moving speed detector section if the mobile communication terminal is in a wait state, a speed detection value of the second moving speed detector section is equal to or more than a predetermined value, and a difference value between the speed detection value of the first moving speed detector section and that of the second moving speed detector section is less than a predetermined value.

Furthermore, the speed detection value selector section can select a predetermined value other than each of the speed detection values of the first and second moving speed detector sections if the mobile communication terminal is in a wait state, a speed detection value of the second moving speed detector section is equal to or more than a predetermined value, and a difference value between the speed detection value of the first moving speed detector section and that of the second moving speed detector section is equal to or more than a predetermined value.

Also, the terminal may further include a storage section for keeping the selection criterion therein.

In addition, the terminal may further include a speed correcting section for correcting the detection value of the second speed detector section if the terminal is connected to a radio base station installed indoors.

In this situation, the speed correcting section corrects the detection value on the basis of a ratio between a cell radius of a radio base station installed outdoors and a cell radius of a radio base station installed indoors.

Furthermore, the terminal may further include a storage section for keeping therein the selected speed detection value and a corresponding communication parameter value associated with each other.

A moving speed detecting method of the present invention is a method of detecting a moving speed of a mobile communication terminal, including detecting a speed of the mobile communication terminal using a plurality of mutually different detection methods and selecting any one of speed detection values detected using the respective moving speed detection methods on the basis of a predetermined selection criterion.

In this case, the plurality of detection methods may be a first moving speed detection method to detect a moving speed using a fading frequency and a second moving speed detection method to detect a moving speed using a cell moving frequency.

And, in this situation, the method is capable of selecting a speed detection value detected using the first moving speed detection method if the mobile communication terminal is in communication.

Also, the method is able to select a speed detection value detected using the first moving speed detection method if the mobile communication terminal is in a wait state and a speed detection value detected using the second moving speed detection method is less than a predetermined value.

Furthermore, the method is able to select a speed detection value detected using the first moving speed detection method if the mobile communication terminal is in a wait state, a speed detection value detected using the second moving speed detector section is equal to or more than a predetermined value, and a difference value between the speed detection value detected using the first moving speed detection method and that detected using the second moving speed detection method is less than a predetermined value.

In addition, the method can select a predetermined value other than each of the speed detection values detected using the first and second moving speed detection methods if the mobile communication terminal is in a wait state, a speed detection value detected using the second moving speed detection method is equal to or more than a predetermined value, and a difference value between the speed detection value detected using the first moving speed detection method and that detected using the second moving speed detection method is equal to or more than a predetermined value.

Advantages of the Invention

The mobile communication terminal of the present invention includes a plurality of moving speed detector sections having mutually different detection methods and employs a configuration to select any one of speed detection values of the respective moving speed detector sections based on a predetermined selection criterion, and hence is capable of detecting its own moving speed with high accuracy in any situation.

BEST MODE FOR CARRYING OUT THE INVENTION

FIG. 1 is an example of a control block diagram of a mobile communication terminal 10 in accordance with an exemplary embodiment of the present invention. The mobile communication terminal 10 includes a transceiver section 12, a coder/decoder section 14, an input/output section 16, a storage 18, and a controller 20.

The transceiver section 12 transmits and receives a radio wave via an antenna 22 with a radio base station, not shown. The transceiver section 12 includes a field intensity measuring section 12a and a signal component detector section 12b. The field intensity measuring section 12a measures intensity of an electric field of a received signal. The signal component detector section 12b receives an intermediate frequency signal of the received signal to detect a signal component corresponding to an envelope of the field intensity measured by the field intensity measuring section 12a using the intermediate frequency signal. The signal component is output to a first moving speed detector section 30 configuring the controller 20.

The coder/decoder section 14 encodes a signal to be sent to the radio base station and decodes a signal received from the base station.

The input/output section 16 delivers therefrom a signal decoded by the coder/decoder section 14 and receives as an input thereto a signal to be encoded. The input/output section 16 includes as an input section, for example, a microphone and a camera, and as an output section, for example, a speaker and a display.

The storage 18 stores programs and data necessary for operation of the controller 20. Also, the storage 18 stores a communication parameter value definition table TBL to define a relationship between moving speeds of the mobile communication terminal 10 and communication parameter values.

The controller 20 manages the overall mobile communication terminal 10 including the transceiver section 12, the coder/decoder section 14, the input/output section 16, and the storage 18. The controller 20 includes a first moving speed detector section 30 to detect a moving speed of the mobile communication terminal 10 using a fading frequency, a second moving speed detector section 32 to detect a moving speed of the mobile communication terminal 10 using a cell moving frequency, a speed detection value selector section 34, a communication parameter value determining section 36, and a communication parameter value setting section 38.

The first moving speed detector section 30 includes a filter circuit 30a, a comparator circuit 30b, a counter circuit 30c, and a moving speed estimation circuit 30d. The filter circuit 30a receives as an input the signal component from the signal component detector section 12b to remove a direct-current component therefrom. The comparator circuit 30b compares the signal obtained by removing the direct-current component with a threshold value. The counter circuit 30c counts, based on a result of the comparison, a width or a period of a signal exceeding the threshold value to measure the fading frequency. The estimation circuit 30d conducts an arithmetic operation for a product between a fading pitch and a wavelength of a carrier, which are obtainable from the fading frequency, to thereby calculate the moving speed of the mobile communication terminal 10. The calculated moving speed is output as a first speed detection value D1 to the speed detection value selector section 34.

The second moving speed detector section 32 checks a cell moving frequency to calculate the moving speed of the mobile communication terminal 10. Here, the cell moving frequency indicates the number of cells which the mobile communication terminal 10 passes in a constant period of time. The configuration to calculate the moving speed of the terminal using the cell moving frequency is well known, and hence description thereof will be avoided. The calculated moving speed is output as a second speed detection value D2 to the speed detection value selector section 34.

The speed detection value selector section 34 receives as inputs the respective speed detection values D1 and D2 and selects any one of the plurality of speed detection values D1 and D2 based on a predetermined selection criterion to output the value as a selected speed value D3 to the communication parameter value determining section 36.

The communication parameter value determining section 36 searches the communication parameter value definition table TBL using the selected speed value D3 as a key to determine values of various communication parameters corresponding to the selected speed value D3.

The communication parameter value setting section 38 sets the determined communication parameter values to the mobile communication terminal 10.

FIG. 2 shows an example of the setting contents of the communication parameter value definition table TBL to be stored in the storage 18. The communication parameter value definition table TBL defines appropriate communication parameter values for each finally selected value, i.e., the selected speed value D3. The communication parameter may include, for example, a radio channel monitor interval, an adjacent channel monitor interval, closed loop power control, a cell retrieval algorithm, channel estimation, and a path reallocation averaging number.

Incidentally, in the mobile communication terminal 10 according to the exemplary embodiment of the present invention described above, if the mobile communication terminal 10 conducts communication based on, for example, a W-CDMA scheme, the transceiver section 12 includes a separating and coupling section, an oscillator, a Phase Locked Loop (PLL) circuit, a demodulator section, a diffusing and inverse-diffusing section to execute baseband signal processing, and a rake receiver to receive radio waves such as a reflected wave to combine the waves (none of the components are shown).

Also, the coding/decoding scheme of the coder/decoder section 14 is determined according to the communication scheme or the format of transmitted and received data of the mobile communication terminal 10. If the transmitted and received data is, for example, transmitted and received data for a voice call, the coder/decoder section 14 carries out communication using the Pulse Code Modulation (PCM) coding scheme or an Adaptive Multi-Rate (AMR) coding scheme.

Furthermore, as the input/output section 16, it may be not necessarily the sections described above, but it may be connector means conforming to a predetermined communication specification to connect these units, such as a connector. The communication specification may include, for example, the Universal Serial Bus (USB) as an interface for data communication, The Institute of Electrical and Electronics Engineers, Inc. (IEEE) 1394 as a high-speed serial bus, and the Bluetooth as a radio communication technology for portable information devices.

FIG. 3 is a flowchart to explain a representative operation example (moving speed detection method) of the mobile communication terminal 10 in accordance with the exemplary embodiment of the present invention.

First, the first and second moving speed detector sections 30 and 32 respectively detect the moving speed of the mobile communication terminal 10 to output the respective speed detection values D1 and D2 to the speed detection value selector section 34 (step S1).

The speed detection value selector section 34 judges whether the mobile communication terminal 10 is in communication or in a wait state (step S2). If the mobile communication terminal 10 is in communication, the speed detection value selector section 34 selects the first speed detection value D1 and outputs this value as a selected speed value D3 to the communication parameter value determining section 36 (step S3).

On the other hand, if the mobile communication terminal 10 is in a wait state, the speed detection value selector section 34 judges whether or not the second speed detection value D2 is equal to or more than a predetermined value (e.g., 20 km/h). If the second speed detection value D2 is less than the predetermined value, namely, if the mobile communication terminal 10 is stopped or is moving at a lower speed than a predetermined speed, the speed detection value selector section 34 selects the second speed detection value D2 and outputs this value as a selected speed value D3 to the communication parameter value determining section 36 (step S5).

If the second speed detection value D2 is equal to or more than the predetermined value, namely, if the mobile communication terminal 10 is moving at a higher speed than a predetermined speed, the speed detection value selector section 34 judges whether or not the difference value between the first speed detection value D1 and the second speed detection value D2 is equal to or more than a predetermined value (e.g., ±2 Km/h; step S6). The speed detection value selector section 34 selects the first speed detection value D1 if the difference value is less than the predetermined value (step S7), and selects a fixed value (e.g., a mean value of the first and second speed detection values D1 and D2) other than the first or second speed detection values D1 and D2 if the difference value is equal to or more than the predetermined value (step S8). The speed detection value selector section 34 outputs the selected value as a selected speed value D3 to the communication parameter value determining section 36.

The communication parameter value determining section 36 determines the value of the communication parameter corresponding to the selected speed value D3 (step S9). Specifically, the communication parameter value determining section 36 searches the communication parameter value definition table TBL to determine the values of various communication parameters corresponding to the selected speed value D3. The communication parameter value setting section 38 sets the determined communication parameter values to the mobile communication terminal 10 (step S10).

As described above, the mobile communication terminal 10 of the exemplary embodiment includes a plurality of moving speed detector sections, i.e., the first and second moving speed detector sections 30 and 32 having mutually different detection methods and selects, based on a predetermined selection criterion, an output from any one of the first and second moving speed detector sections 30 and 32. And, the selection criterion is determined to always select one of the detection values of the first and second moving speed detector sections 30 and 32 having higher detection accuracy. Hence, the mobile communication terminal 10 is capable of detecting its own moving speed with high accuracy in any situation.

For example, resultantly, reliability of communication parameter values set according to the moving speed can be increased; as a result, it is also possible to improve communication performance (e.g., reduction in the connecting time, improvement of call retention ratio, adaptation, etc.) of the mobile communication terminal 10.

Incidentally, the mobile communication terminal 10 may further include a judge section to determine whether or not the mobile communication terminal 10 is connected to a radio base station arranged indoors, and a speed correcting section (neither thereof is shown) to correct the second speed detection value D2 of the second moving speed detector section if the mobile communication terminal 10 is connected to the radio base station, which arranged indoors. In this situation, the speed correcting section corrects the second speed detection value D2 based on a ratio between a cell radius of a radio base station installed outdoors and a cell radius of a radio base station installed indoors. As a result of this operation, a disadvantage to erroneously determine a higher cell moving frequency during indoor movement due to the cell radius difference can be solved and hence the detection precision of the moving speed can be further improved.

Moreover, the mobile communication terminal 10 may also include a base station density information acquiring section to acquire base station density information of a region in which the mobile communication terminal 10 is existing and a speed correcting section (neither thereof is shown) to correct the second speed detection value D2 on the basis of the base station density information. As a result, it is possible to avoid the erroneous detection of the moving speed due to the difference in the base station density.

Also, the present inventor has obtained knowledge, i.e., the lower the fading frequency is, the less the variation in the field intensity is; and contrarily, the higher the fading frequency is, the more the variation in the field intensity is. Hence, the first moving speed detector section 30 can also derive the first speed detection value D1 using this relationship. Furthermore, data of correlation between the fading frequency and the moving speed of the terminal can be experimentally obtained to be beforehand stored in the storage 18 or the like and then the first moving speed detector section 30 can accesses the storage 18 to make a search using a fading frequency as a key for an associated moving speed.

Incidentally, the speed detecting section installed in the mobile communication terminal 10 is not limited to the first moving speed detector section 30 using a fading frequency and the second moving speed detector section 32 using a cell moving frequency. The mobile communication terminal 10 may include, in place thereof or in addition thereto, another speed detecting section. When another speed detecting section is installed, the selection criterion shown in FIG. 3 is appropriately changed in consideration of a characteristic of the detecting section appropriately.

As another speed detecting section, there may be employed, for example, a speed detecting section employing a Global Positioning System (GPS). This speed detecting section obtains a moving speed of a mobile communication terminal 1 on the basis of a change in time of positional information (the latitude and the longitude) of the mobile communication terminal 10 acquired from a GPS satellite. Furthermore, as another speed detecting section, it is possible to adopt a speed detecting section utilizing a Difference Global Positioning System (DGPS) more accurate than the GPS. This speed detecting section attains a position of the mobile communication terminal 10 in time series and detects a change direction by a gyroscope, and further checks the state of the speed change by an acceleration sensor. The speed detecting section is also capable of detecting a speed at each point of time of the mobile communication terminal 10.

Also, various moving speed selection criteria shown in FIG. 3 may be beforehand stored in a table form in the storage 18. Thanks to this provision, the mobile communication terminal 10 can select the selected speed value D3 at a high speed without using a complicated configuration thereof.

BRIEF DESCRIPTION OF DRAWINGS

FIG. 2 is a format diagram showing an example of the contents set to the communication parameter value definition table.

DESCRIPTION OF REFERENCE NUMERALS

Figure 1:
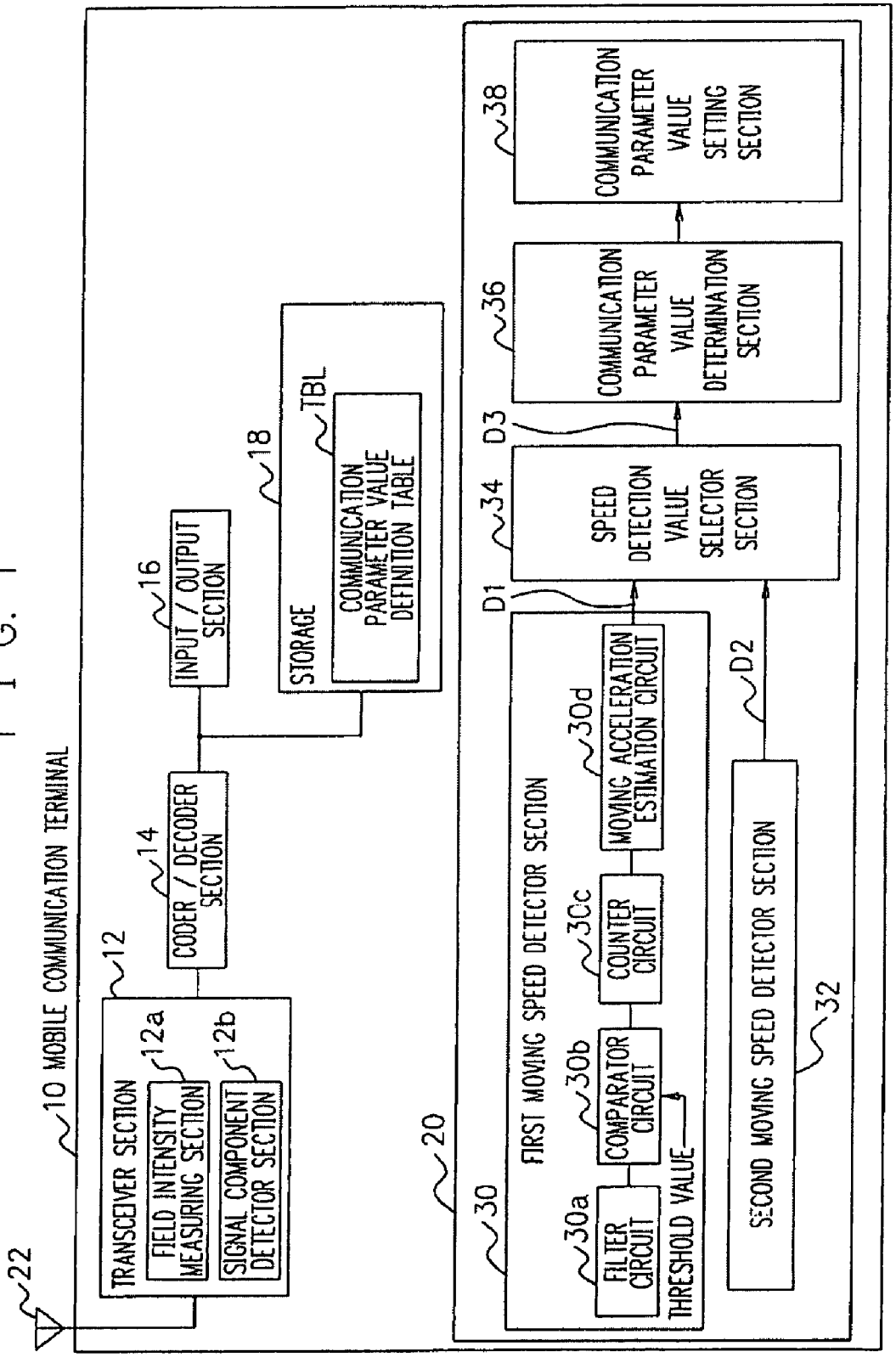
FIG. 1 is an example of a control block diagram of a mobile communication terminal in accordance with an exemplary embodiment of the present invention.
Figure 3:
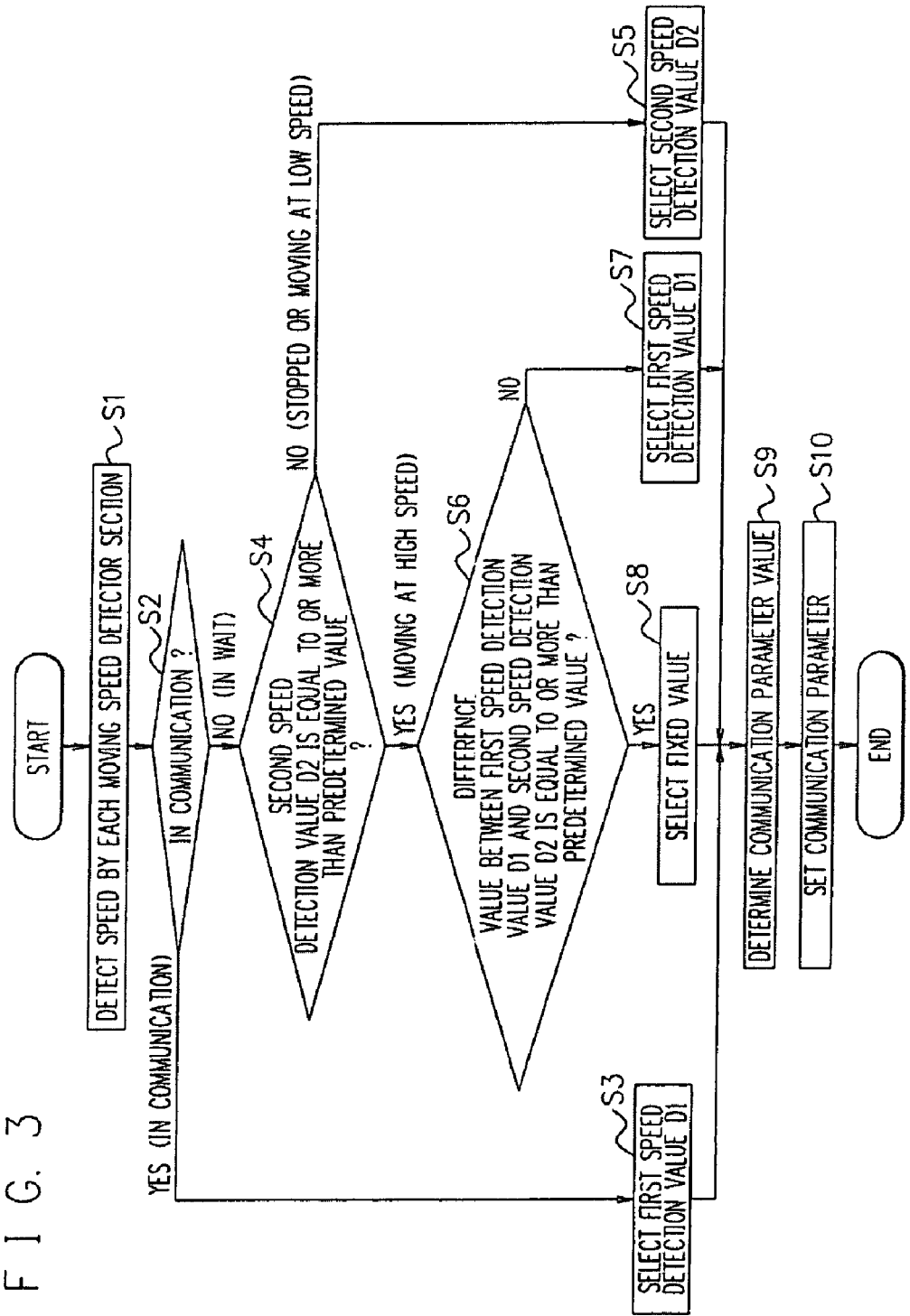
FIG. 3 is a flowchart to explain a representative operation example of the mobile communication terminal in accordance with the exemplary embodiment of the present invention.

10 Mobile communication terminal
18 Storage
20 Controller
30 First moving speed detector section
32 Second moving speed detector section
34 Speed detection value selector section
36 Communication parameter value determining section
38 Communication parameter value setting section
TBL Communication parameter value definition table
D1 First speed detection value
D2 Second speed detection value
D3 Selected speed value

What is claimed is:

1. A mobile communication terminal, characterized by comprising:
   a plurality of moving speed detector sections having mutually different detection methods; and
   a speed detection value selector section for selecting any one of speed detection values of the respective moving speed detector sections on the basis of a predetermined selection criterion,
   wherein said plurality of moving speed detector sections are a first moving speed detector section to detect a moving speed using a fading frequency and a second moving speed detector section to detect a moving speed using a cell moving frequency, and wherein said speed detection value selector section selects a speed detection value of the first moving speed detector section if the mobile communication terminal is in a wait state, a speed detection value of the second moving speed detector section is equal to or more than a predetermined value, and a difference value between the speed detection value of the first moving speed detector section and that of the second moving speed detector section is less than a predetermined value.

2. The mobile communication terminal in accordance with claim 1, characterized in that the speed detection value selector section selects a speed detection value of the first moving speed detector section if the mobile communication terminal is in communication.

3. The mobile communication terminal in accordance with claim 1, characterized in that the speed detection value selector section selects a speed detection value of the second moving speed detector section if the mobile communication terminal is in a wait state and the speed detection value of the second moving speed detector section is less than a predetermined value.

4. The mobile communication terminal in accordance with claim 1, characterized by further comprising a storage section for keeping the selection criterion therein.

5. The mobile communication terminal in accordance with claim 1, characterized by further comprising a speed correcting section for correcting the detection value of the second speed detector section if the terminal is connected to a radio base station installed indoors.

6. The mobile communication terminal in accordance with claim 5, characterized in that the speed correcting section corrects the detection value on the basis of a ratio between a cell radius of a radio base station installed outdoors and a cell radius of a radio base station installed indoors.

7. The mobile communication terminal in accordance with claim 1, characterized by further comprising a storage section for keeping therein the selected speed detection value and a corresponding communication parameter value associated with each other.

8. A mobile communication terminal, characterized by comprising:
   a plurality of moving speed detector sections having mutually different detection methods; and
   a speed detection value selector section for selecting any one of speed detection values of the respective moving speed detector sections on the basis of a predetermined selection criterion,
   wherein said plurality of moving speed detector sections are a first moving speed detector section to detect a moving speed using a fading frequency and a second moving speed detector section to detect a moving speed using a cell moving frequency, and
   wherein said speed detection value selector section selects a predetermined value other than each of the speed detection values of the first and second moving speed detector sections if the mobile communication terminal is in a wait state, a speed detection value of the second moving speed detector section is equal to or more than a predetermined value, and a difference value between the speed detection value of the first moving speed detector section and that of the second moving speed detector section is equal to or more than a predetermined value.

9. The mobile communication terminal in accordance with claim 8, characterized in that the speed detection value selector section selects a speed detection value of the first moving speed detector section if the mobile communication terminal is in communication.

10. The mobile communication terminal in accordance with claim 8, characterized in that the speed detection value selector section selects a speed detection value of the second moving speed detector section if the mobile communication terminal is in a wait state and the speed detection value of the second moving speed detector section is less than a predetermined value.

11. The mobile communication terminal in accordance with claim 8, characterized by further comprising a storage section for keeping the selection criterion therein.

12. The mobile communication terminal in accordance with claim 8, characterized by further comprising a speed correcting section for correcting the detection value of the second speed detector section if the terminal is connected to a radio base station installed indoors.

13. The mobile communication terminal in accordance with claim 12, characterized in that the speed correcting section corrects the detection value on the basis of a ratio between a cell radius of a radio base station installed outdoors and a cell radius of a radio base station installed indoors.

14. The mobile communication terminal in accordance with claim 8, characterized by further comprising a storage section for keeping therein the selected speed detection value and a corresponding communication parameter value associated with each other.

15. A moving speed detecting method of detecting a moving speed of a mobile communication terminal, characterized by comprising:
    detecting a speed of the mobile communication terminal using a plurality of mutually different detection methods and
    selecting any one of speed detection values detected using the respective moving speed detection methods on the basis of a predetermined selection criterion, wherein said plurality of detection methods are a first moving speed detection method to detect a moving speed using a fading frequency and a second moving speed detection method to detect a moving speed using a cell moving frequency,
characterized by selecting a speed detection value detected using the first moving speed detection method if the mobile communication terminal is in a wait state, a speed detection value detected using the second moving speed detector section is equal to or more than a predetermined value, and a difference value between the speed detection value detected using the first moving speed detection method and that detected using the second moving speed detection method is less than a predetermined value.

16. The moving speed detection method in accordance with claim 15, characterized by selecting a speed detection value detected using the first moving speed detection method if the mobile communication terminal is in communication.

17. The moving speed detection method in accordance with claim 15, characterized by selecting a speed detection value detected using the first moving speed detection method if the mobile communication terminal is in a wait state and a speed detection value detected using the second moving speed detection method is less than a predetermined value.

18. A moving speed detecting method of detecting a moving speed of a mobile communication terminal, characterized by comprising:
    detecting a speed of the mobile communication terminal using a plurality of mutually different detection methods and
    selecting any one of speed detection values detected using the respective moving speed detection methods on the basis of a predetermined selection criterion, wherein said plurality of detection methods are a first moving speed detection method to detect a moving speed using a fading frequency and a second moving speed detection method to detect a moving speed using a cell moving frequency,
characterized by selecting a predetermined value other than each of the speed detection values detected using the first and second moving speed detection methods if the mobile communication terminal is in a wait state, a speed detection value detected using the second moving speed detection method is equal to or more than a predetermined value, and a difference value between the speed detection value detected using the first moving speed detection method and that detected using the second moving speed detection method is equal to or more than a predetermined value.

19. The moving speed detection method in accordance with claim 18, characterized by selecting a speed detection value detected using the first moving speed detection method if the mobile communication terminal is in communication.

20. The moving speed detection method in accordance with claim 18, characterized by selecting a speed detection value detected using the first moving speed detection method if the mobile communication terminal is in a wait state and a speed detection value detected using the second moving speed detection method is less than a predetermined value.

* * * * *